(12) United States Patent
Wilson et al.

(10) Patent No.: US 9,442,628 B2
(45) Date of Patent: Sep. 13, 2016

(54) PAYROLL DATA ENTRY AND MANAGEMENT

(75) Inventors: Richard Lee Wilson, Randolph, NJ (US); Richard James Anderson, Peterborough (GB); Gary Richard Bartram, Lincolnshire (GB); Sanjay Jay Patel, Brookline, MA (US); Timothy Shih Kuong Liu, Chicago, IL (US)

(73) Assignee: Automatic Data Processing, Inc., Roseland, NJ (US)

( * ) Notice: Subject to any disclaimer, the term of this patent is extended or adjusted under 35 U.S.C. 154(b) by 395 days.

(21) Appl. No.: 13/213,888

(22) Filed: Aug. 19, 2011

(65) Prior Publication Data

US 2012/0060112 A1    Mar. 8, 2012

Related U.S. Application Data

(60) Provisional application No. 61/375,529, filed on Aug. 20, 2010, provisional application No. 61/421,849, filed on Dec. 10, 2010.

(51) Int. Cl.
  *G06F 3/048* (2013.01)
  *G06F 3/0482* (2013.01)
  *G06F 3/0488* (2013.01)

(52) U.S. Cl.
  CPC ......... *G06F 3/0482* (2013.01); *G06F 3/04886* (2013.01)

(58) Field of Classification Search
  None
  See application file for complete search history.

(56) References Cited

U.S. PATENT DOCUMENTS

| | | | |
|---|---|---|---|
| 6,084,585 A * | 7/2000 | Kraft et al. | 715/733 |
| 6,137,488 A * | 10/2000 | Kraft et al. | 715/866 |
| 6,185,540 B1 * | 2/2001 | Schreitmueller et al. | 705/4 |
| 7,571,113 B2 * | 8/2009 | Fettig et al. | 705/16 |
| 2002/0167545 A1 * | 11/2002 | Kang et al. | 345/780 |
| 2002/0184148 A1 * | 12/2002 | Kahn et al. | 705/40 |
| 2003/0197055 A1 * | 10/2003 | Ben-Aissa | 235/379 |
| 2004/0019542 A1 * | 1/2004 | Fuchs et al. | 705/32 |
| 2004/0049436 A1 * | 3/2004 | Brand et al. | 705/30 |
| 2008/0082934 A1 * | 4/2008 | Kocienda et al. | 715/773 |
| 2009/0171669 A1 * | 7/2009 | Engelsma et al. | 704/275 |
| 2009/0273565 A1 * | 11/2009 | Garside et al. | 345/168 |
| 2010/0033439 A1 * | 2/2010 | Kodimer et al. | 345/173 |
| 2010/0122218 A1 * | 5/2010 | Mahadevan et al. | 715/853 |
| 2010/0161355 A1 * | 6/2010 | Stangel | 705/3 |
| 2010/0169199 A1 * | 7/2010 | Fuller et al. | 705/34 |

(Continued)

OTHER PUBLICATIONS

HH2 Timecard, [online], Feb. 2011, retrieved from the internet: <https://www.youtube.com/watch?v=y3NZ-CijwUU>.*

(Continued)

*Primary Examiner* — Stella E Higgs
(74) *Attorney, Agent, or Firm* — Morrison & Foerster LLP

(57) ABSTRACT

A method can include displaying a user interface on a display of a mobile device. The user interface can include a scrollable payroll data section with multiple selectable fields and a data entry section configured to accept input of payroll data for the multiple fields. The method can further include simultaneously displaying the scrollable payroll data section and the data entry section and, in response to an input, simultaneously scrolling through one or more of the multiple selectable fields of the payroll data section while maintaining the payroll data section in place. A device and computer-readable medium can be configured to implement the method and variations thereof.

20 Claims, 18 Drawing Sheets

(56) References Cited

U.S. PATENT DOCUMENTS

| | | | |
|---|---|---|---|
| 2010/0198634 A1* | 8/2010 | Hayden et al. | 705/7 |
| 2010/0231612 A1* | 9/2010 | Chaudhri et al. | 345/684 |
| 2010/0241989 A1* | 9/2010 | Wen | 715/800 |
| 2011/0004841 A1* | 1/2011 | Gildred et al. | 715/780 |
| 2011/0296351 A1* | 12/2011 | Ewing et al. | 715/841 |
| 2012/0192093 A1* | 7/2012 | Migos et al. | 715/773 |

OTHER PUBLICATIONS

HHTimesheet, [online], Feb. 2009, retrieved from the internet: < https://www.youtube.com/watch?v=ljebD18Gw1w>.*

Basic Time Card Form Application—Mobile App—GoCanvas.com, [online], Dec. 2009, retrieved from the internet <https://www.youtube.com/watch?v=2XIt91avtP8>.*

HHTimesheet, [online], Feb. 2009, retrieved from the internet: <https://www.youtube.com/watch?v=ljebD18Gw1w>.*

* cited by examiner

PAYROLL DATA ENTRY AND MANAGEMENT

REFERENCE TO RELATED APPLICATIONS

This application claims the priority of U.S. Provisional Patent Application No. 61/375,529, filed on Aug. 20, 2010, and U.S. Provisional Patent Application No. 61/421,849, filed on Dec. 10, 2010, the contents of which are herein incorporated by reference.

FIELD

This generally relates to techniques, devices, and systems for payroll data entry and management.

BACKGROUND

In society's increasingly fast-paced and mobile environment, employers seek convenience and ease in most activities. One task employers are faced with is the task of generating and managing payroll for their employees. Initially, payroll processing was an arduous manual task, requiring the responsible individual to compute the base pay, applicable taxes, deductions, and the like for each of the employer's employees. While these calculations were first performed by hand, advances in technology have made the task progressively easier. From the advent of adding machines and calculators to the proliferation of computers, payroll management has become simpler, quicker, and more efficient.

SUMMARY

This summary is provided merely to introduce certain concepts and not to identify any key or essential features of the claimed subject matter.

In an embodiment, a mobile device can include a memory configured to store computer instructions and a processor configured to execute the computer instructions to display a user interface. The user interface can include a scrollable payroll data section with multiple selectable fields and a data entry section configured to accept input of payroll data for the multiple fields. The user interface can be further configured to enable scrolling of the payroll data section without requiring scrolling of the data entry section.

In an embodiment, a method can include displaying a user interface on a display of a mobile device. The user interface can include a scrollable payroll data section with multiple selectable fields and a data entry section configured to accept input of payroll data for the multiple fields. The method can further include simultaneously displaying the scrollable payroll data section and the data entry section and, in response to an input, simultaneously scrolling through one or more of the multiple selectable fields of the payroll data section while maintaining the payroll data section in place.

In an embodiment, a non-transitory computer-readable medium can store instructions executable by a microprocessor to perform various steps. The steps can include displaying a user interface on a display of a mobile device, the user interface including a scrollable payroll data section with multiple selectable fields and a data entry section configured to accept input of payroll data for the multiple fields. The steps can further include simultaneously displaying the scrollable payroll data section and the data entry section and, in response to an input, simultaneously scrolling through one or more of the multiple selectable fields of the payroll data section while maintaining the payroll data section in place.

BRIEF DESCRIPTION OF THE DRAWINGS

FIG. 3 illustrates a home screen of an exemplary user interface before log-in.

FIG. 4 illustrates a home screen of an exemplary user interface after log-in.

Figure 6:
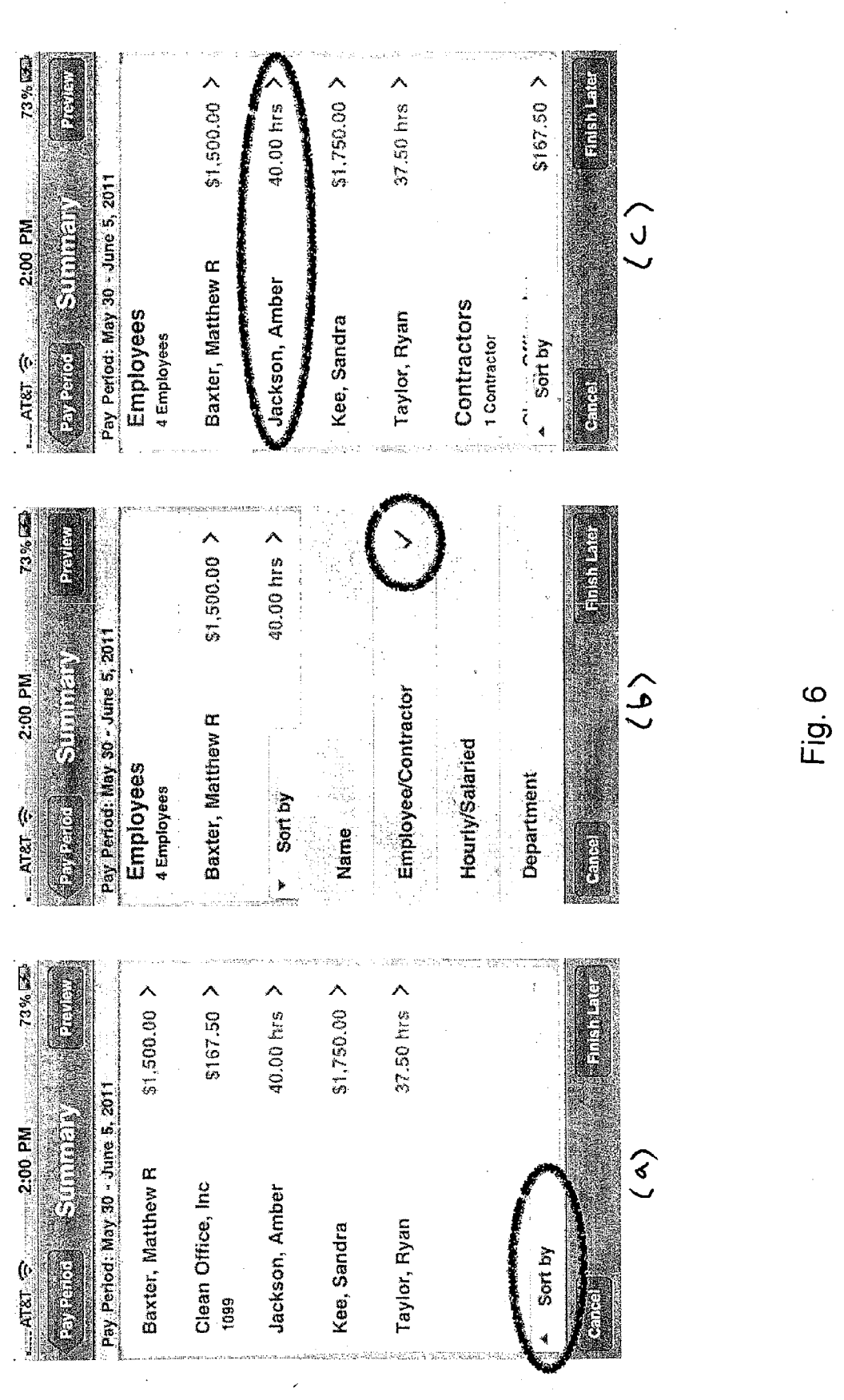

FIG. 6(a) illustrates a screen of an exemplary user interface showing multiple employees.

FIG. 6(b) illustrates a screen of an exemplary user interface for selecting a sort category FIG. 6(c) illustrates a screen of an exemplary user interface showing employees sorted by category.

FIGS. 8-12 illustrate an example of a scrollable list on the payroll entry screen of an exemplary user interface.

Figure 13:
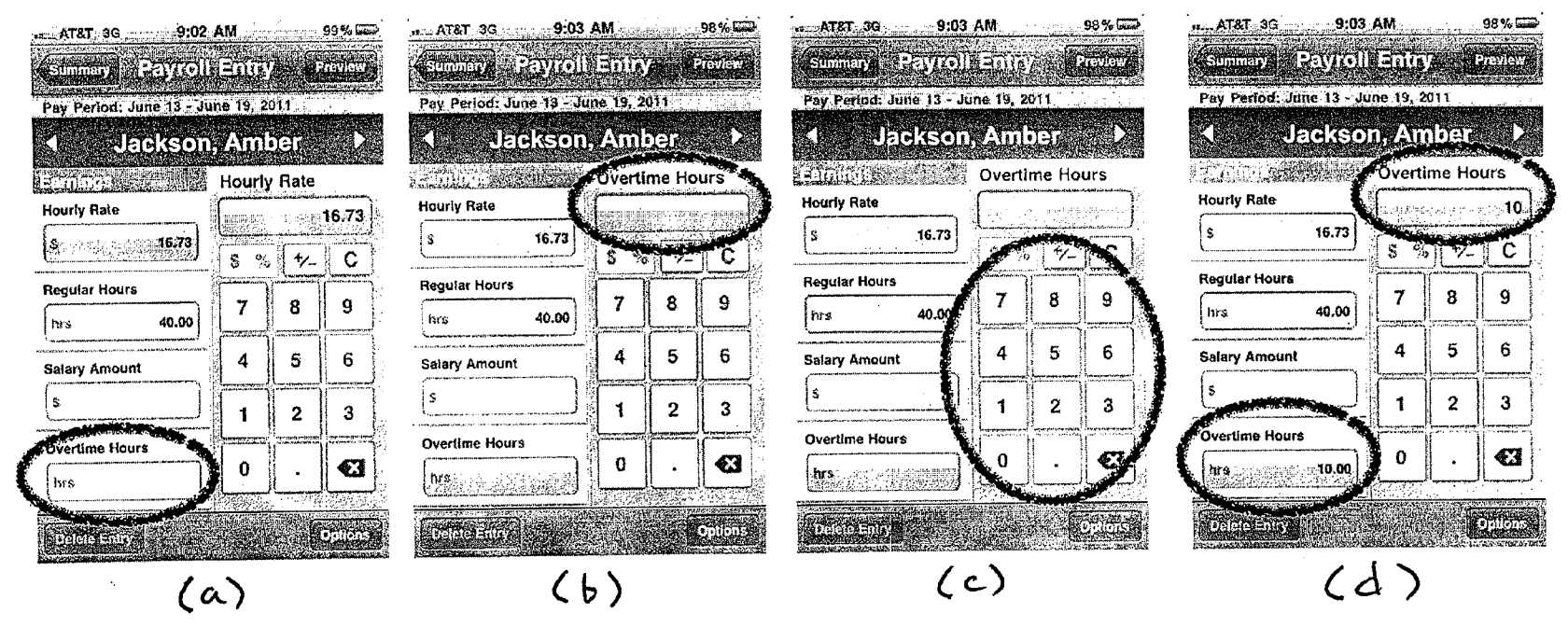

FIGS. 13(a)-(d) illustrate an example of how data can be input into an exemplary user interface.

DETAILED DESCRIPTION

This disclosure relates to mobile applications for managing payroll. Various aspects described herein may be applied to any of the particular applications and embodiments set forth below. Furthermore, the various aspects may be applied to other types of user interfaces and/or to payroll management applications in general. The embodiments may be applied as a standalone system or method, or as part of an integrated software package, such as a payroll management package or application. Different aspects of the embodiments can be appreciated individually, collectively, or in combination with each other. Numerous modifications and variations of the embodiments can be made by one of ordinary skill in the art without undue experimentation.

Figure 1:
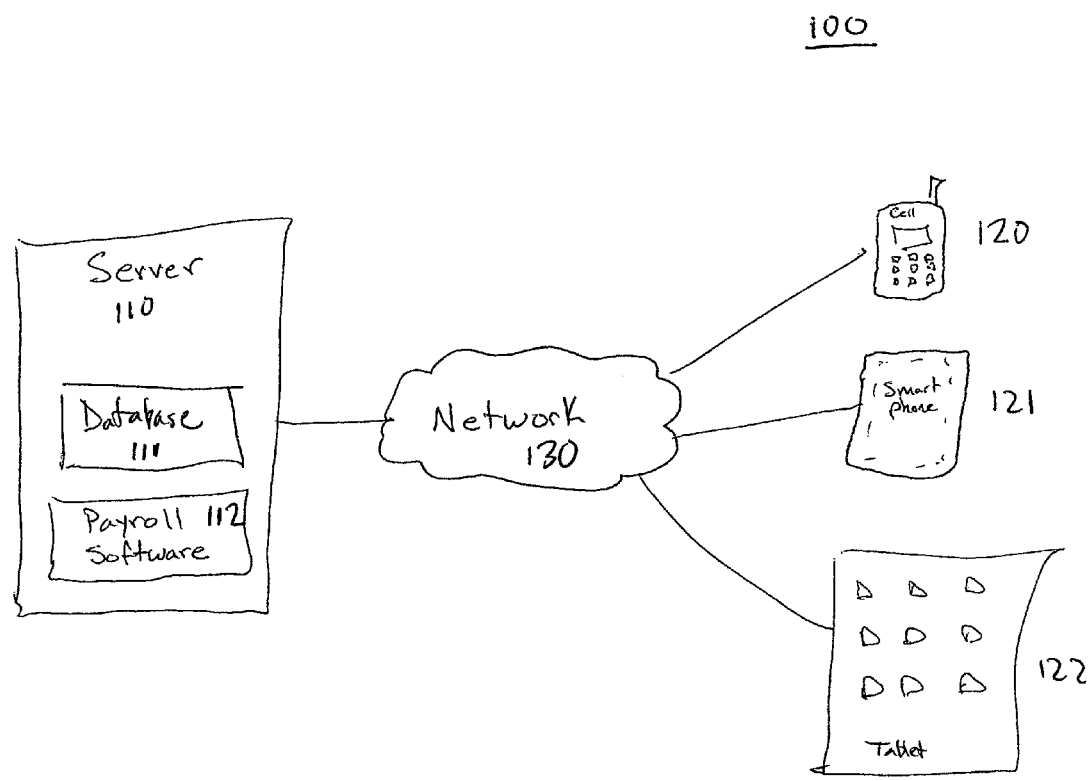
FIG. 1 illustrates an example of a system infrastructure according to an embodiment.

FIG. 1 illustrates an exemplary system infrastructure according to an embodiment. System 100 can include server 110, mobile devices 120, 121, 122, and network 130.

Figure 18:
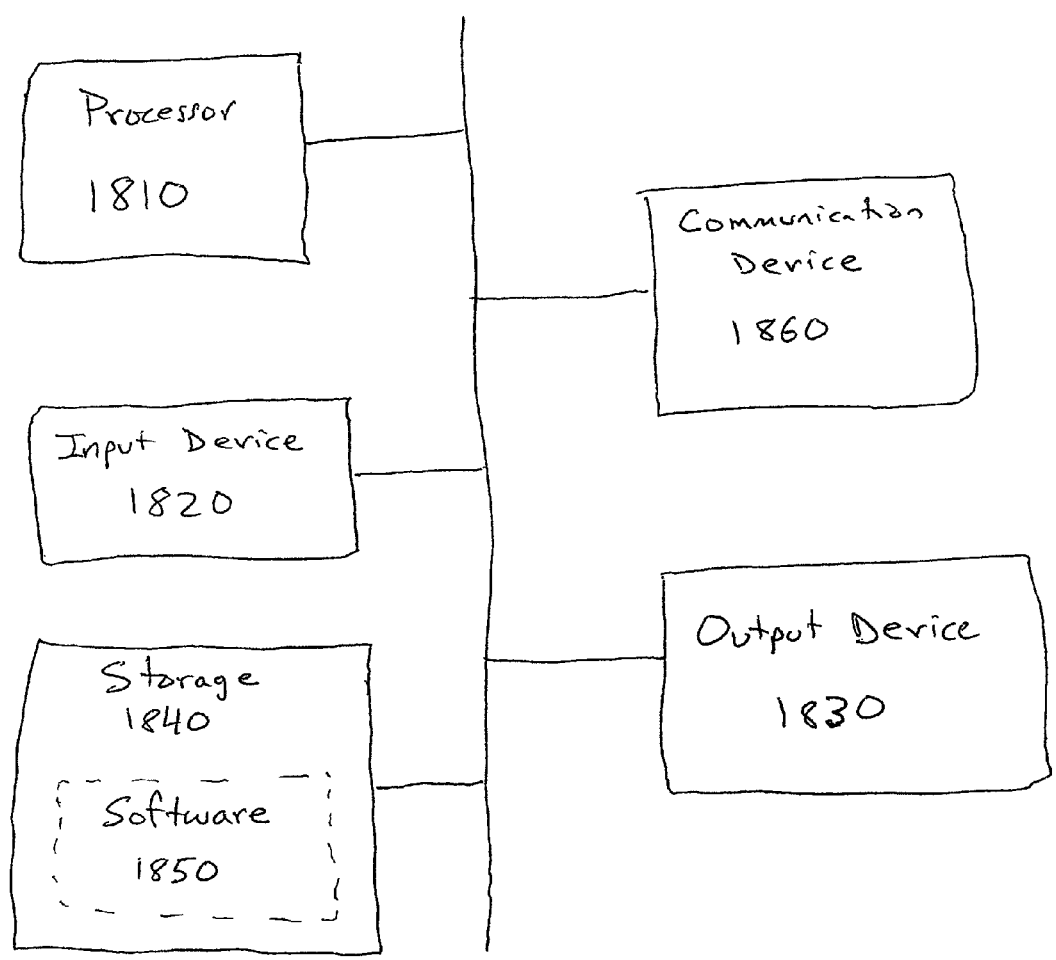
FIG. 18 illustrates an example of a computing device.

Server 110 can be implemented on one or more computing devices, as described with respect to FIG. 18 for example. In an embodiment, functionality of server 110 can be implemented using any of numerous server programming platforms. For example, a JBoss Seam web application framework running on an underlying Java Enterprise Edition-based application server program can be used in an embodiment. Seam can be a useful framework because it can provide a secure server environment with various authentication features.

Server 110 can include database 111 and can deploy payroll software 112. Database 111 can store information regarding multiple devices that have access to the system, such as mobile devices 120, 121, 122. Database 111 can store device identification information, user account information, file and directory information, and status information, for example. Database 111 can be created and implemented using any of numerous database management systems or can be, programmed by one of ordinary skill in the art. In an embodiment, database 111 can be implemented using a relational database management system built on the MySQL platform, which can provide useful access control features.

Payroll software 112 can constitute computer instructions for implementing a payroll management system. The software may permit management and manipulation of employee information, hours worked, salary/wage information, benefits information, tax information, company information, bank information, and the like. The software may permit an administrator or other person to calculate payroll, modify payroll, process payroll (including sending banks information for paying employees and/or printing checks for employees), maintain records, run reports, and the like. Payroll software can be accessed via a computer workstation (not shown) directly connected to server 110 or connected to server 110 via network 130. Payroll software 112 can be accessed via a web interface using a web browser or via a client payroll application installed on the workstation.

Payroll software 112 may support and integrate with a mobile payroll application, as described below. The mobile payroll application, which can be installed on a mobile device, can permit management of payroll from the mobile device. Payroll software 112 may receive instructions from the mobile payroll application over network 130.

Server 110 can provide various network services for managing remote devices, such as assigning policies, deploying software, applying updates, managing e-mail, and maintaining parallel directories of files and folders stored on managed mobile devices. For example, in an embodiment, server 110 can integrate with Microsoft's Active Directory, which can provide many of these services.

Communications among the various system components can be secured and authenticated using numerous techniques. For example, the Secure Remote Password protocol can be implemented between workstation computers and server 110 to ensure authentication and a secure communication channel. Additionally, system 100 can use Secure Sockets Layer or Transport Layer Security technology to encrypt communications between the various system components. This can include employing a public key infrastructure using digital certificates. Secure communication channels can be established between system components over network 130. Network 130 can comprise wired communication lines and/or wireless communication links such as wireless fidelity (WiFi). In an embodiment in which server 110 is implemented on multiple computers, communications between the computers can be secured as well.

A mobile device used in this system can be any of numerous computing devices. For example, mobile device 120 can be a cellular phone, mobile device 121 can be a smart phone (e.g., iPhone®) or PDA, and mobile device 122 can be a tablet computer (e.g., iPad®). Other mobile devices may be used as well, such as laptops, netbooks, integrated computers (e.g., integrated in a vehicle), and the like. The mobile device can include a display such as, for example, a liquid crystal display, light emitting diode display, touchpad or touchscreen display, computer monitor, and/or other means known in the art for emitting a visually perceptible output.

The mobile device can include a software application for payroll management, such as a client-side application program designed to communicate with server 110. This software application can be called a mobile payroll application. The mobile payroll application can leverage the features and services of the underlying operating system of the mobile device.

In some embodiments, the mobile payroll application can be the single or primary application for managing the payroll. Furthermore, the payroll data may be stored on the mobile device itself instead of in database 111. Accordingly, there would be no need for database 111 and payroll software 112 running on server 110, and the mobile device could be entirely self-sufficient with respect to the payroll management software.

Figure 2:
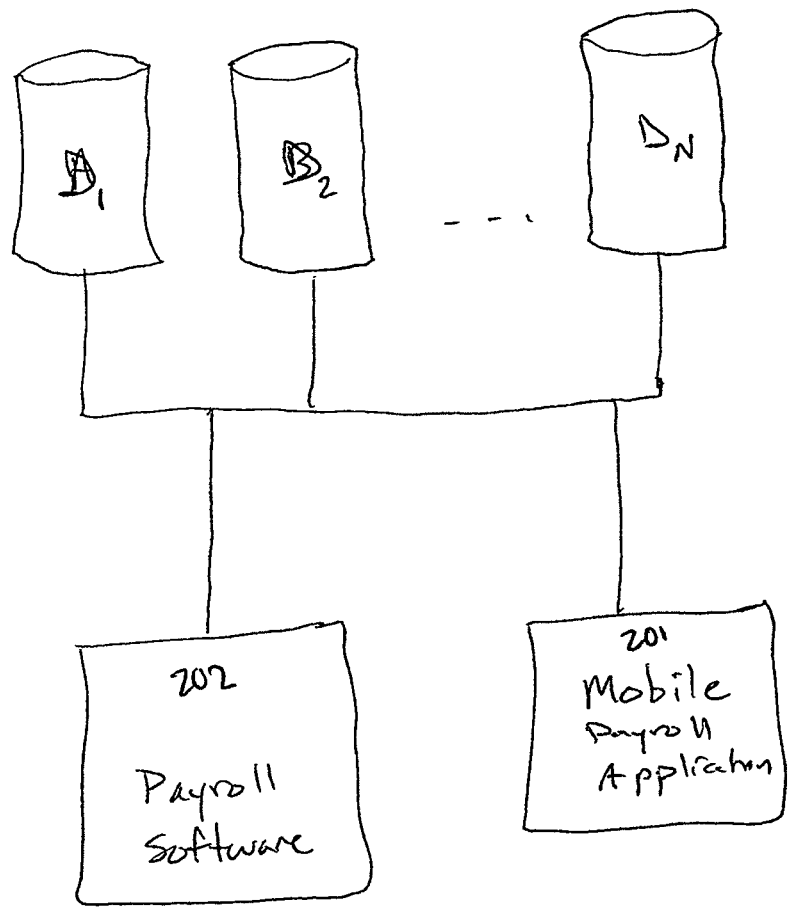
FIG. 2 illustrates an example of payroll software and a mobile payroll application sharing data.

FIG. 2 depicts an example of a mobile payroll application 201 and payroll software 202 sharing data stored in databases $D_1$ through $D_n$. Mobile payroll application 201 may be a standalone application, or may be part of or otherwise associated with a larger application or software, such as payroll software 202. Mobile payroll application 201 may communicate with payroll software 202 and/or share data or information with payroll software 202. As described in more detail below, mobile payroll application 201 may be a smaller application (e.g., gadget, widget, tool, object, program) that may not require the same complexity, power, or memory as payroll software 202 but also may not have the same functionality as payroll software 202. Mobile payroll application 201 may enable a user to interact with payroll data and may provide a graphical user interface for such interaction.

In an embodiment, payroll software 202 may reside on a first system and mobile payroll application 201 may reside on a second system. The first system and the second system may be any combination of network devices. For example, the first system may be a server and the second system may be a client device. A server computer may have a software program residing in memory. A client device may have a mobile application residing in local memory. In some instances, the mobile application may have been downloaded to the client device from the server. The mobile application on the client device may communicate with the payroll software on the server. In some instances, the mobile application may primarily function as a standalone application, but may communicate with the server application in particular situations. In one specific example, the mobile application may be on a mobile device (such as an iPhone®, Android®-based phone, Blackberry®, or other smart phone) and the full-sized software program may be on a computer.

Mobile payroll application 201 may share data with payroll software 202 and/or with other software applications, such as on computer workstations or other mobile devices. For example, mobile payroll application 201 and payroll software 202 may access the same payroll data. In some instances, the data may be stored in one or more databases. The data may be stored locally payroll software 202, locally with mobile payroll application 201, or may be stored at another system or memory (e.g., a server or client device). The data may or may not be divided and stored on different memories.

In an embodiment, as depicted in FIG. 2, data may be stored on multiple databases $D_1$, $D_2$, $D_n$. These databases may be stored anywhere. For example, they may be stored on the same system or on different systems. They may be on the company's premises, they may be hosted by a payroll service provider, or they may be hosted by a cloud computing provider, for example. In an embodiment, payroll software 202 may be configured to have access to all or most of the data in the databases while mobile payroll application 201 may be configured to have access to less data in the databases. For example, mobile payroll application 201 may be configured to access only data stored in database $D_1$ and not in the other databases, or alternatively, only data stored in certain portions of database $D_1$. This type of restricted access may be appropriate based on the identity of the user of mobile payroll application 201 or based on the functionality of mobile payroll application 201, for example.

In some embodiments, mobile payroll application 201 may be optimized such that it provides only certain features and/or functionality compared to payroll software. In order to access information in the mobile application, there may or may not be fewer selections or pages a user needs to go through. In some instances, mobile payroll application 201 may require less processing or computing power and less space in memory than payroll software 202. In some cases, mobile payroll application 201 can rely on payroll software 202 or on other cloud computing resources to perform complex calculations or store large amounts of data. Additionally, mobile payroll application 202 may provide specialized functionality that may be advantageous in the context of a mobile device, such as alerts or notifications so as to provide time sensitive data to the mobile user.

Entering and managing data used to calculate earnings, taxes, deductions, and the like can be a repetitive, time-consuming process. Keeping track of pay rates, benefits, rules, and exceptions can be difficult. Furthermore, the status of the worker (e.g., hourly employee, salaried employee, hourly contractor, and non-hourly contractor) can sometimes dictate what payroll data and/or features are applicable. For example, for hourly employees, pay data can include regular work hours, overtime work hours, vacation hours, sick hours, personal hours, and temporary changes to the hourly pay rate for a specific pay period. For salaried employees, bonuses and commissions may be recorded in addition to the above information. Pay data can come from a variety of sources, such as timecards, time sheets, billing software, calendars, emails, phone calls, etc.

A user interface can be designed to facilitate the efficient and effective management of payroll via a mobile device. An exemplary user interface for a mobile payroll application is described below with respect to FIGS. 3-18.

FIGS. 3-18 depict examples of various screenshots from an exemplary user interface for a mobile payroll application implemented on an iPhone®. Many modifications can be made to the user interface while still achieving similar functionality, and similar user interfaces may be implemented on other mobile phones, hand-held devices, PDA's, computers, and electronic devices by one of ordinary skill in the art without undue experimentation.

Figure 3:
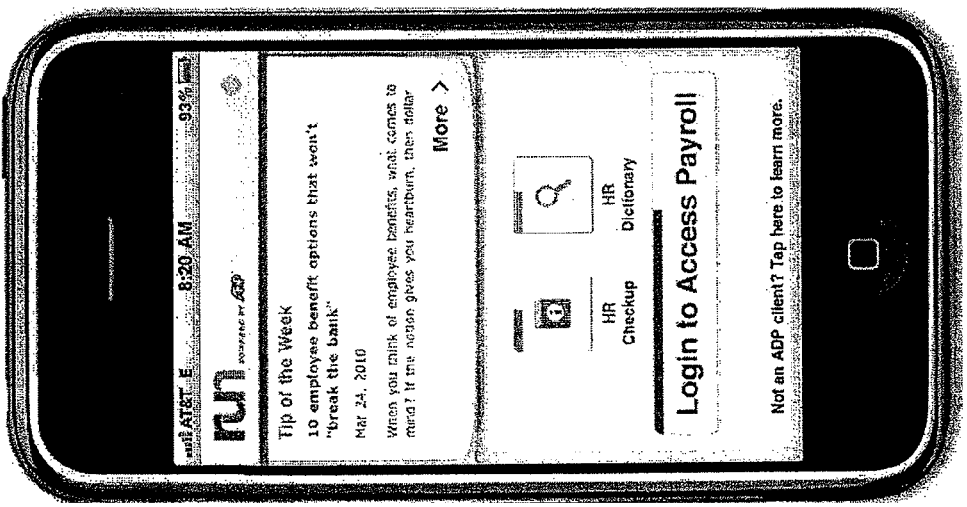

FIG. 3 depicts an example of a home screen of a mobile payroll application. The home screen can contain a button entitled 'Login to Access Payroll'. A user can tap the button and go through a log-on process to access payroll. For example, a dialog box including fields for entering a user identification and password can appear. Selecting a field can cause a keyboard to appear to allow the user to enter log-in credentials. Of course, in other mobile devices that perhaps do not have a touch screen display, other input devices such as a keypad and trackpad can be used to interact with the user interface.

Figure 4:
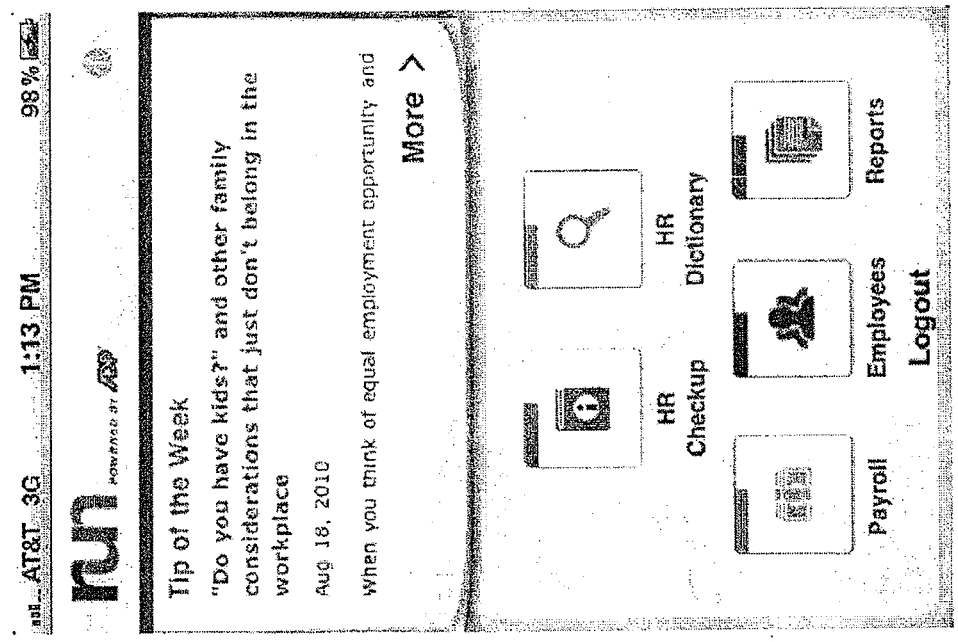
Figure 5:
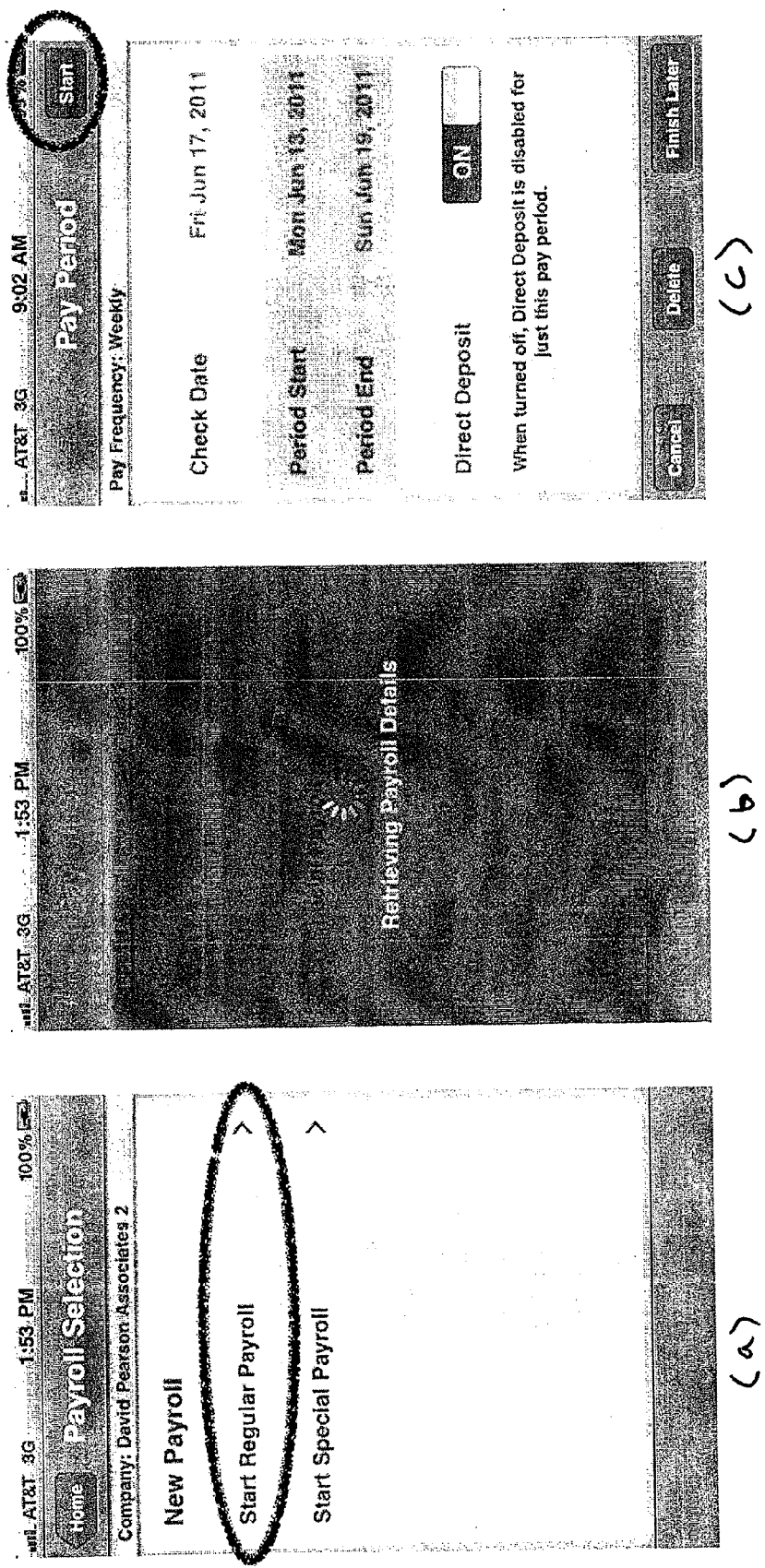
FIGS. 5(a)-(c) illustrate an example of a payroll selection feature of an exemplary user interface.

FIG. 4 depicts an example of a home screen after log-in. The screen contains buttons entitled 'Payroll', 'Employees', and 'Reports'. Selecting the Payroll button can allow the user to manage a current payroll or create and manage a special payroll, as described below. Selecting the Employees button can allow the user to view a list of all employees and edit employee data. Selecting the Reports button can allow the user to run a number of reports related to payroll.

If a user taps on the Payroll button, the next screen, which is depicted in FIG. 5(a), can allow a user to start a regular payroll or a special payroll. If a user selects the Start Regular Payroll button, the application can retrieves payroll information for the current payroll period. FIG. 5(b) depicts an intermediate screen that can appear when the mobile payroll application is retrieving data for the current payroll. As discussed previously, the payroll data can be stored locally on the mobile device or in a database on a server, on the mobile user's personal computer, or elsewhere. The appropriate location for storing the data can depend on the size of the company, the number of employees, the amount of data, and the like.

Upon retrieving the payroll data, the screen depicted in FIG. 5(c) can be displayed. This screen can contain certain information about the selected payroll. For example, the screen can display information regarding the payroll period, the check date, the period start and end dates, and whether direct deposits are enabled.

If the user taps on the upper right hand Start button, the application can display the screen depicted in FIG. 6(a), which can contain a list of the employees and the contractors that are currently associated with this particular payroll. Although various features may be discussed below with respect to just an employee or just a contractor, the features can be applied to both unless explicitly noted.

A user can tap on the Sort by button and, as depicted in FIG. 6(b), the user can sort workers by various characteristics, such as name, employee/contractor, hourly/salaried, or department. The hourly/salaried characteristic can be important in the payroll context because such a distinction can carry with it certain implications that would cause a payroll administrator, for example, to treat the two groups differently. FIG. 6(c) depicts an example of the workers sorted according to employee/contractor.

Figure 7:
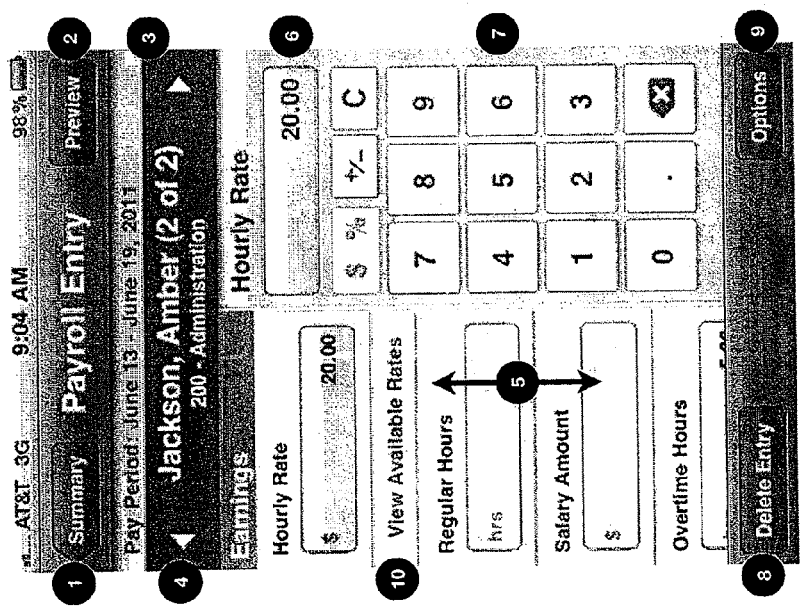
FIG. 7 illustrates a payroll entry screen of an exemplary user interface.
Figure 14:
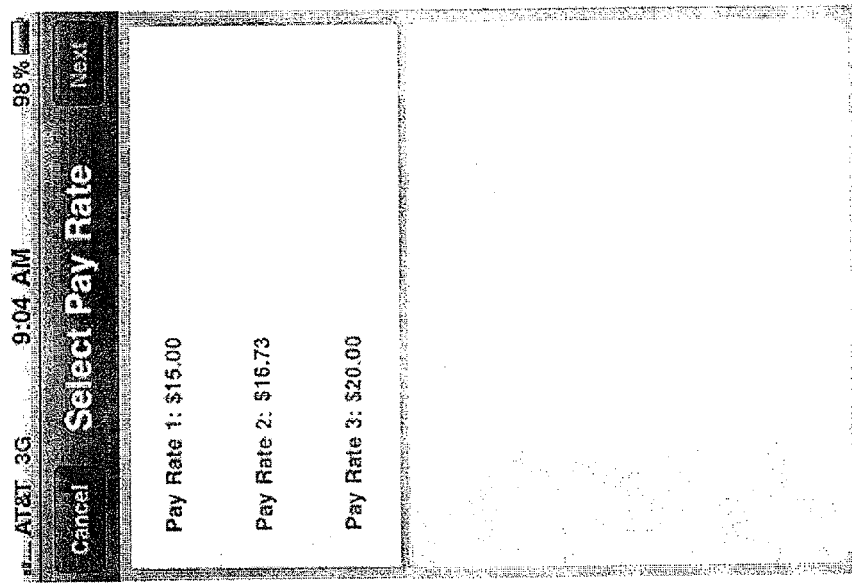
FIGS. 14(a)-(b) illustrate an example of a multiple pay rate feature of an exemplary user interface.
Figure 15:
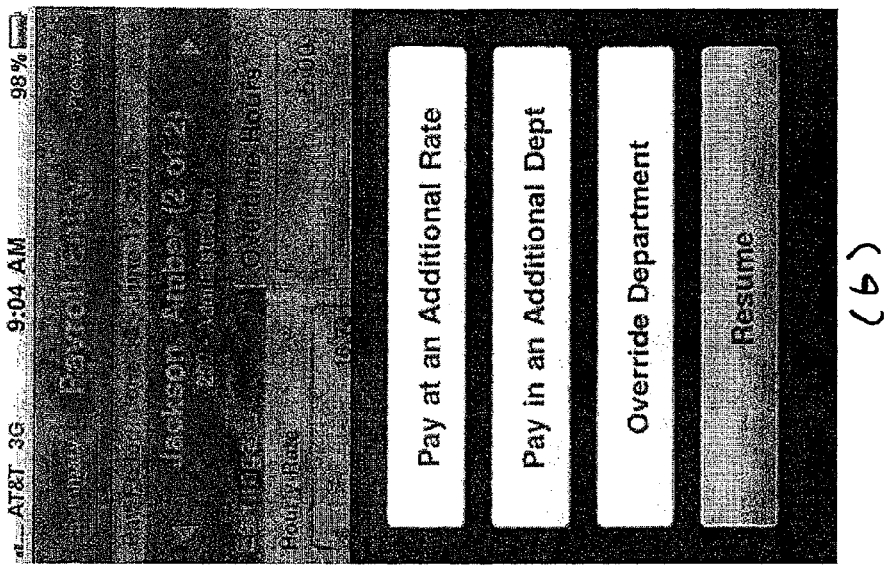
FIGS. 15(a)-(b) illustrate an example of a feature for modifying pay rates and other information of an exemplary user interface.
Figure 15:
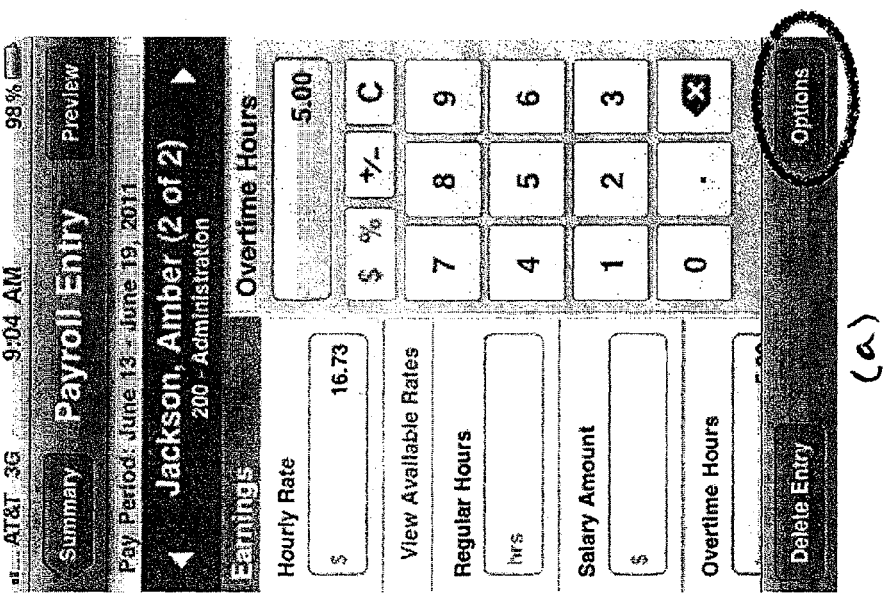
Figure 16:
FIGS. 16(a)-(c) illustrate an example of a payroll summary and calculation feature of an exemplary user interface.
Figure 16:
Figure 16:
Figure 17:
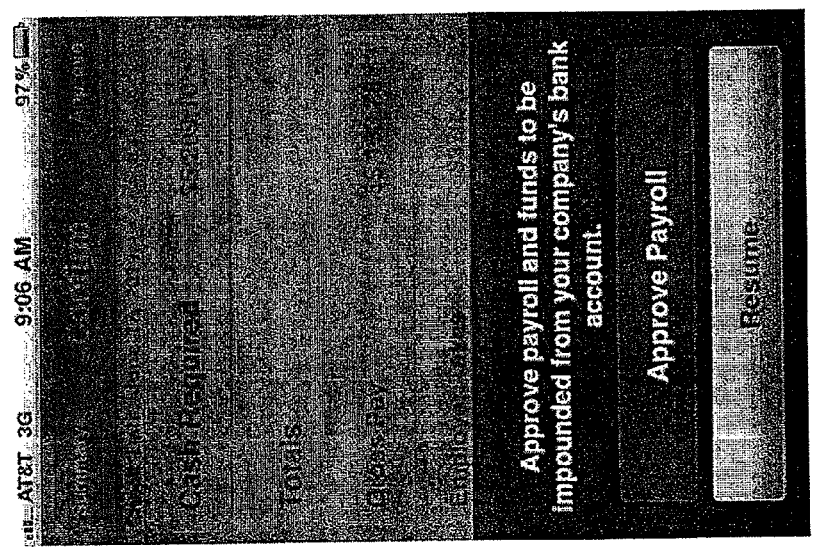
FIGS. 17(a)-(b) illustrate an example of a payroll approval feature of an exemplary user interface.
Figure 17:
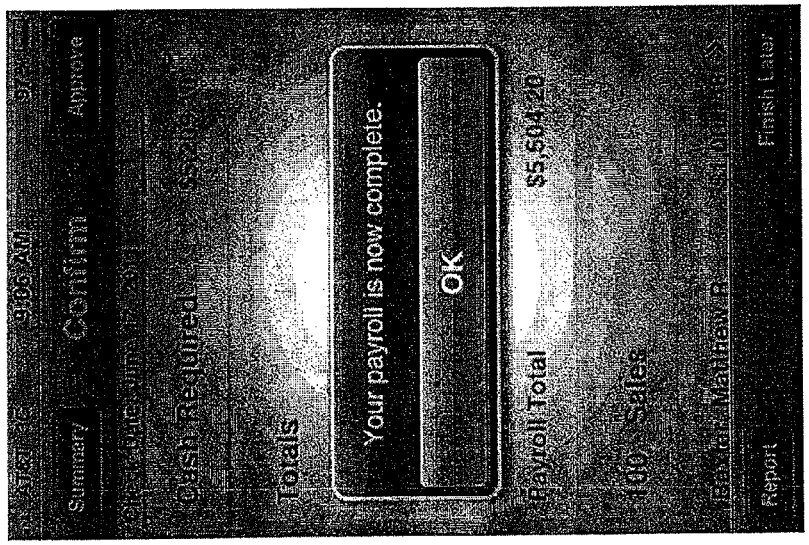

FIG. 7 depicts an example of a payroll entry screen that can be displayed after an employee has been selected in the previous screen. Summary button 1 is a navigation button that permits the user to return to the list of employees and contractors. Preview button 2 allows the user to calculate and preview payroll totals.

Information bar 3 can display information and parameter such as the pay period, the name of the employee or contractor, the payroll entry number for the selected worker (e.g., the worker may have multiple payroll entries due to working in multiple positions, for example), the department name, etc. In particular, here a department number and department name can be displayed under the employee's name—'200-Administration'—and an indication of the number of payroll entry screens associated with the employee is displayed to the right of the employee's name—'2 of 2'. The payroll entry screen also includes two new features.

The arrows 4 permit the user to move to the previous or next worker or payroll entry screen. Additionally, the user may be able to navigate in this fashion by swiping left or right with his finger. Section 5 corresponds to a scrollable list of earnings and deductions. The view available rates button 10 can display certain predetermined rates associated with the selected worker, as described below with respect to FIG. 14.

Input section 6 and keypad 7 permit a user to change particular values listed in section 5. The user can tap on a particular earning, for example, and the keypad can allow the user to type in information corresponding to that earning. If the selected data field from section 5 is already populated with a value, the user can override that value using keypad 7. The delete entry button 8 can allow the user to delete the current payroll entry screen. The options button 9 can provide the user access to other features, as described below with respect to FIG. 15.

The design of the payroll data entry screen can thus provide the user with the ability to perform various tasks without having to switch screens. For example, the user can move to the previous or next employee/contractor within a selected group using the arrows. The user can enter pay data related to earnings, including regular and overtime hours, vacation ours, sick hours, personal hours, bonus amounts, commissions, and other amounts as well as 1099 miscellaneous amounts and reimbursements for contractors. The user can enter deduction overrides for loans, advances, 401K amounts or percentages, accidental death and dismemberment pre-tax/post-tax amounts, etc. The user can also set the amount of certain deductions to a specific value or a percentage of gross pay, enter negative amounts for adjustments, and add, view, edit, or delete multiple pay rates, departments, and checks for an employee or contractor.

Figure 8:
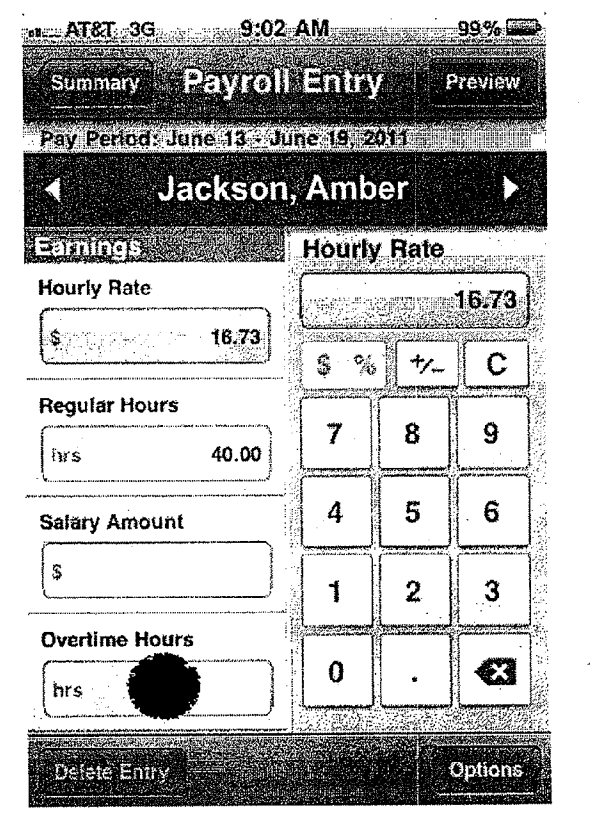
Figure 9:
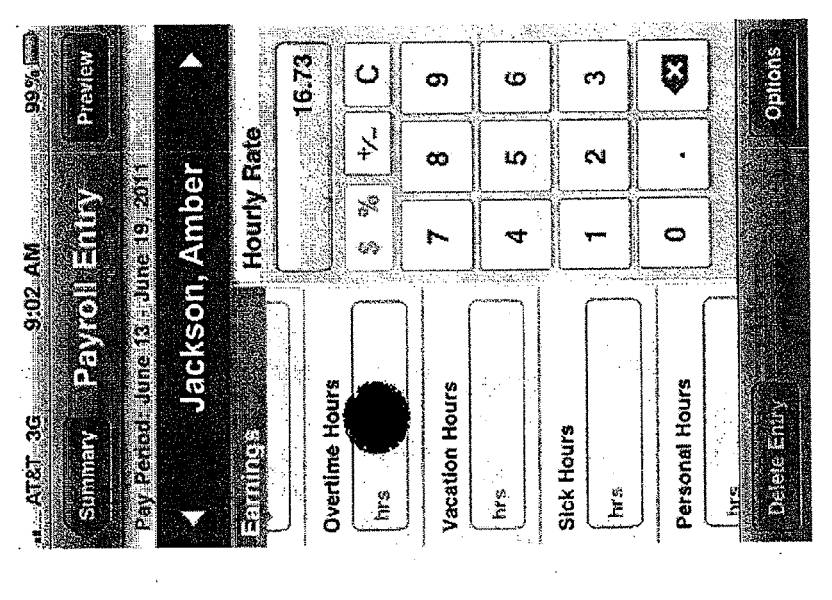
Figure 10:
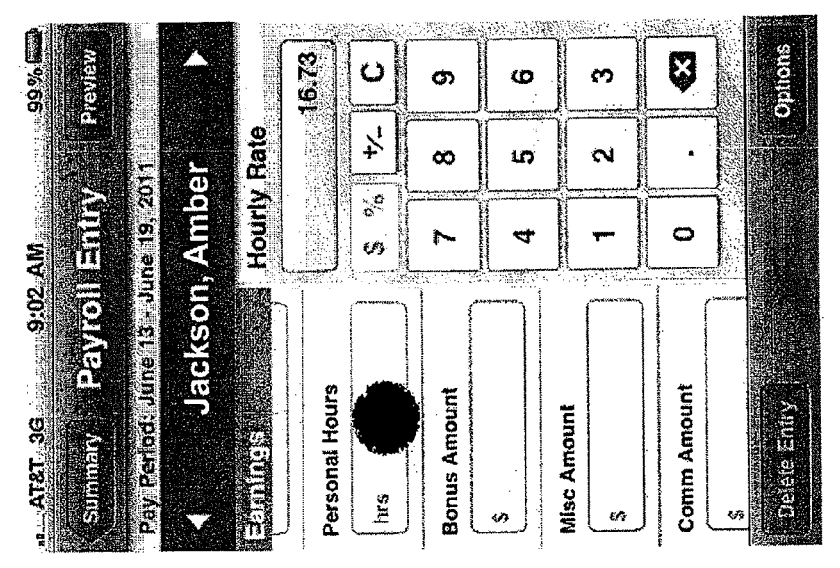
Figure 11:
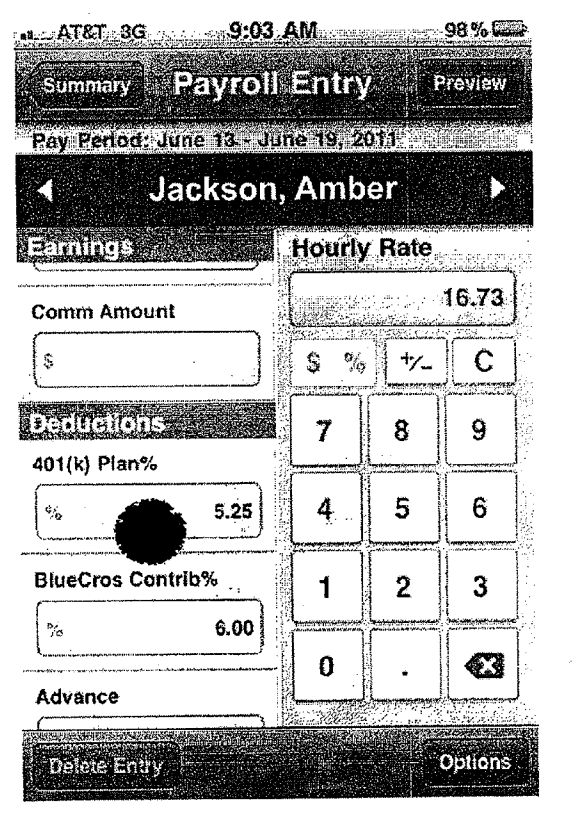
Figure 12:
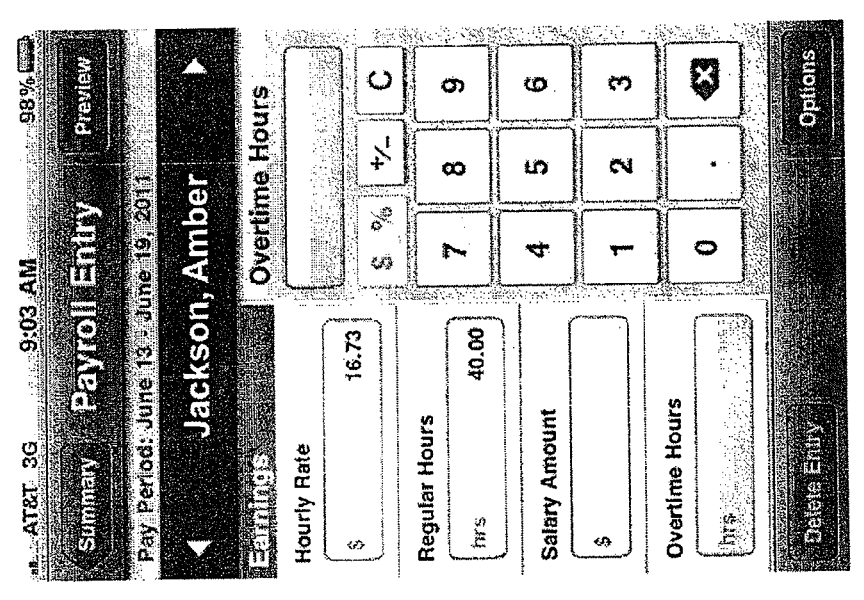

In FIGS. 8 and 9, the black dot on the field labeled 'Overtime Hours' represents a fingerprint flicking upwards to scroll through the list in section 5. In FIGS. 10 and 11, the black dot again represents an upwards flick. In FIG. 12, the user has returned to the top of the scrollable list. These figures also illustrate some of the various categories of data that may be managed using the mobile payroll application. Of course, it is to be understood that these are merely examples and one of ordinary skill in the art can readily visualize the myriad types of data that may be managed using this application.

FIGS. 13(a)-(d) depict an example of a user selecting the Overtime Hours field in the payroll entry screen and entering data. When the field is selected in FIG. 13(a), title above the keypad changes to display 'Overtime Hours' and is configured to accept input for that field, as depicted in FIG. 13(b). A user can use the keypad as shown in FIG. 13(c) to enter an amount, in this particular case "10", and FIG. 13(d) shows the value "10" displayed in the Overtime Hours field.

Accordingly, a user may scroll through the various data entry fields under earnings, deductions, and the like, on the left-hand side while the keypad remains anchored on the right-hand side. In other words, scrolling through the data entry fields does not cause the keypad and keypad input field to scroll. This permits the user to enter appropriate information in the appropriate field in a quick, efficient, and intuitive manner, even on a small device, like the iPhone®.

In FIG. 14(a), the view available rates button appears below the hourly rate field if there is more than one hourly pay rate associated with the employee. Hourly employees can have more than one hourly pay rate for many reasons. For example, the employee could work in different roles or different shifts, each role or shift being compensated differently. Selecting the view available rates button can display the pay rates associated with the employee, as depicted in FIG. 14(b) for example. The appropriate pay rate can then be selected and will be populated in the hourly rate field.

In FIG. 15(a) an options button appears in the lower right-hand corner of the payroll entry screen. Selecting the options button can cause a menu of options to be displayed, as shown in FIG. 15(b) for example. Selecting 'Pay at an Additional Rate' can permit the user to pay an employee at an additional rate supplemental to the employee's base pay rate. Selecting 'Pay in an Additional Dept' can permit the user to pay an employee in an additional department in which the employee worked. Selecting 'Override Department' can permit the user to temporarily override a department associated with the employee.

As depicted in FIG. 16(a), when the user is ready to calculate and preview the payroll totals, after updating pay information for the employees for example, the user can tap the preview button and the application can perform or cause to be performed a real-time payroll calculation. FIG. 16(b) depicts an intermediate screen that can be displayed during the calculation. The application can then display the payroll total, as depicted in FIG. 16(c) for example. If the user is satisfied with the payroll calculation, the user can tap on the Approve button, which is located at the upper right-hand side of the screenshot.

In FIG. 17(a), the user can confirm that he wants to process the payroll by clicking the approve payroll button, and the payroll can be processed. Payroll processing can include sending appropriate information to a bank so that they can pay the employees via direct deposit or the like. As discussed earlier, the mobile payroll application can do this entirely on its own in some embodiments, or it can instruct payroll software residing on a server or another computer to take the appropriate steps to process the payroll.

Alternatively, the user can select the 'Finish Later' button located on the screens depicted in FIGS. 16(a)-(b) if the user is not ready to calculate and process payroll. By selecting 'Finish Later', the entered data can be stored for later processing. For example, in the case where the mobile payroll application is working independently, selecting 'Finish Later' can cause the software to save the entered data to local memory on the device or to a database accessible via a cellular or Internet connection, as in a cloud computing environment. In the case where the mobile payroll application is interfacing with payroll software residing on a server or another computer, selecting 'Finish Later' can cause the mobile payroll application to transfer the entered data to the payroll software, which can then store the data in a database. When the user is ready to continue working on the payroll, the user may recall the data via the mobile payroll application. In some embodiments, a user can recall the data and continue working on the payroll via a different platform. For example, the user could recall the data and continue working via a web page interface on a computer or via a mobile payroll application on a different device. Other 'Finish Later' buttons can operate in a similar fashion, such as in FIGS. 5(c) and 6(a)-(c).

The user can then return to the home screen depicted in FIG. 4 after payroll processing by clicking on the OK button depicted in FIG. 17(b).

FIG. 18 shows a block diagram of an example of a computing device, which may generally correspond to or illustrate features and capabilities of server 110, mobile devices 120, 121, 122, or other computers in the system. The form of computing device 1800 may be widely varied. For example, computing device 1800 can be a personal computer, workstation, server, handheld computing device, mobile computing device, or any other suitable type of microprocessor-based device. Computing device 1800 can include, for example, one or more components including processor 1810, input device 1820, output device 1830, storage 1840, and communication device 1860. These components may be widely varied, and can be connected to each other in any suitable manner, such as via a physical bus, network line, or wirelessly for example.

For instance, input device 1820 may include a keyboard, mouse, touch screen or monitor, voice-recognition device, or any other suitable device that provides input. Output device 1830 may include, for example, a monitor or other display, printer, disk drive, speakers, or any other suitable device that provides output.

Storage 1840 may include volatile and/or nonvolatile data storage, such as one or more electrical, magnetic or optical memories such as a RAM, cache, hard drive, CD-ROM drive, tape drive or removable storage disk for example. Communication device 1860 may include, for example, a network interface card, modem, or any other suitable device capable of transmitting and receiving signals over a network.

Network 130 in FIG. 1 may include any suitable interconnected communication system, such as a local area network (LAN) or wide area network (WAN) for example. A network may implement any suitable communications protocol and may be secured by any suitable security protocol. The corresponding network links may include, for example, telephone lines, DSL, cable networks, T1 or T3 lines, wireless network connections, or any other suitable arrangement that implements the transmission and reception of network signals.

Software 1850 can be stored in storage 1840 and executed by processor 1810, and may include, for example, programming that embodies the functionality described in the various embodiments of the present disclosure. The programming may take any suitable form.

Software 1850 can also be stored and/or transported within any computer-readable storage medium for use by or in connection with an instruction execution system, apparatus, or device, such as computing device 1800 for example, that can fetch instructions associated with the software from the instruction execution system, apparatus, or device and execute the instructions. In the context of this document, a computer-readable storage medium can be any medium, such as storage 1840 for example, that can contain or store programming for use by or in connection with an instruction execution system, apparatus, or device.

Software 1850 can also be propagated within any transport medium for use by or in connection with an instruction execution system, apparatus, or device, such as computing device 1800 for example, that can fetch instructions associated with the software from the instruction execution system, apparatus, or device and execute the instructions. In the context of this document, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A mobile device comprising:
   a memory that stores computer instructions, and
   a processor that executes the computer instructions to display a user interface for at least a first employee selected by a user of the mobile device,
   the user interface comprising
   a first user interface for the first employee, the first user interface comprising
      a scrollable payroll data section for the first employee with multiple selectable input fields and
      a data entry section for the first employee that accepts input for modifying payroll data in the multiple input fields,
   the data entry section comprising a first title section, a first keypad and a first keypad input field that displays accepted input,
   wherein the first user interface populates data accepted by the data entry section into a selected input field of the multiple selectable input fields,
   wherein the accepted input is simultaneously displayed in a selected one of the multiple selectable input fields,
   wherein a title corresponding to the selected one of the multiple selectable input fields is displayed in the first title section,
   wherein the scrollable payroll data section and the data entry section are simultaneously displayed,
   wherein the data entry section remains in place while different fields of the multiple selectable input fields of the scrollable payroll data section are displayed,
   wherein a second user interface is generated for a second employee in response to a swipe gesture made by a user of the mobile device while displaying the first user interface,
   wherein generating the second user interface for the second employee in response to the swipe gesture comprises displaying a scrollable payroll data section for the second employee comprising multiple selectable input fields and a data entry section for the second employee,
   wherein the data entry section of the second user interface comprises a second title section, a second keypad and a second keypad input field, wherein input accepted in the second keypad input field is simultaneously displayed in a selected one of the multiple selectable input fields of the second user interface, wherein a title corresponding to the selected one of the multiple selectable input fields is displayed in the second title section, wherein the scrollable payroll data section of the second user interface and the data entry section of the second user interface are simultaneously displayed, wherein the data entry section of the second user interface remains in place while different fields of the multiple selectable input fields of the scrollable payroll data section of the second user interface are displayed, wherein the memory stores payroll information associated with the first employee and the second employee and the user interface modifies the payroll information associated with the first employee and the second employee via the respective scrollable payroll data section and data entry section, and wherein the processor executes the computer instructions to process a payroll based on the information input via the respective scrollable payroll data section and data entry section or to save the information input via the respective scrollable payroll data section and data entry section for later processing.

2. The mobile device of claim 1, wherein the computer instructions comprise a mobile payroll application.

3. The mobile device of claim 2, wherein the mobile payroll application sends data to and receives data from payroll software executed by a server.

4. The mobile device of claim 1, wherein the first user interface displays multiple selectable pay rates associated with the first employee.

5. The mobile device of claim 1, wherein the user interface accepts an input to process the payroll and wherein the mobile payroll application communicates with a server to process the payroll in response to the input to process the payroll.

6. The mobile device of claim 1, comprising a touch screen display.

7. The mobile device of claim 1, wherein the multiple selectable input fields of the first user interface are grouped into categories and the scrollable payroll data section for the first employee comprises a category title for each category of multiple selectable input fields.

8. The mobile device of claim 7, wherein the categories comprise earnings and deductions.

9. The mobile device of claim 1, wherein the scrollable payroll data section for the second employee comprises one or more selectable input fields that are not within the multiple selectable input fields of the scrollable payroll data section for the first employee.

10. A method of generating an employee payroll data entry user interface on a mobile device screen, comprising:
storing payroll information associated with a first employee and payroll information associated with a second employee,
generating a first user interface for a first employee selected by a user of the mobile device,
wherein the first user interface comprises a scrollable payroll data section with multiple selectable input fields and a data entry section that accepts input for modifying payroll data in the multiple input fields, the data entry section comprising a first title section, a first keypad and a first keypad input field that displays accepted input,
wherein the accepted input is simultaneously displayed in a selected one of the multiple selectable input fields,
wherein a title corresponding to the selected one of the multiple selectable input fields is displayed in the first title section,
simultaneously displaying the scrollable payroll data section and the data entry section, wherein the data entry section remains in place while different fields of the multiple selectable input fields of the scrollable payroll data section are displayed,
receiving a selection of one of the multiple selectable input fields of the first user interface,
receiving data input into the data entry section of the first user interface,
populating the received data into the selected input field of the first user interface,
modifying the payroll information associated with the first employee with the received data populated into the selected input field of the first user interface,
generating a second user interface for a second employee in response to a swipe gesture made by a user of the mobile device while displaying the first user interface,
wherein generating the second user interface for the second employee in response to the swipe gesture comprises displaying a scrollable payroll data section for the second employee comprising multiple selectable input fields and the a data entry section for the second employee,
wherein the data entry section of the second user interface comprises a second title section, a second keypad and a second keypad input field,
wherein input accepted in the second keypad input field is simultaneously displayed in a selected one of the multiple selectable input fields of the second user interface,
wherein a title corresponding to the selected one of the multiple selectable input fields is displayed in the second title section,
wherein the scrollable payroll data section of the second user interface and the data entry section of the second user interface are simultaneously displayed,
wherein the data entry section of the second user interface remains in place while different fields of the multiple selectable input fields of the scrollable payroll data section of the second user interface are displayed,
receiving a selection of one of the multiple selectable input fields of the second user interface,
receiving data input into the data entry section of the second user interface,
populating the received data into the selected input field of the second user interface,
modifying the payroll information associated with the second employee with the received data populated into the selected input field of the second user interface, and
processing a payroll based on the modified payroll information associated with the first employee and the modified payroll information associated with the second employee.

11. The method of claim 10, comprising displaying multiple selectable pay rates associated with one or more of the first and second employees.

12. The method of claim 10, comprising sending data to and receiving data from payroll software executed by a server.

13. The method of claim 10, wherein the multiple selectable input fields of the first user interface are grouped into categories and the scrollable payroll data section for the first employee comprises a category title for each category of multiple selectable input fields.

14. The method of claim 13, wherein the categories comprise earnings and deductions.

15. The method of claim 10, wherein the scrollable payroll data section for the second employee comprises one or more selectable input fields that are not within the multiple selectable input fields of the scrollable payroll data section for the first employee.

16. A non-transitory computer-readable medium storing instructions executable by a microprocessor to perform the following steps:
   storing payroll information associated with a first employee and payroll information associated with a second employee,
   generating a first user interface for a first employee based on user selection of the first employee,
   wherein the first user interface comprises a scrollable payroll data section with multiple selectable input fields and a data entry section that accepts input of payroll data for the multiple input fields, the data entry section comprising a first title section, a first keypad and a first keypad input field that displays accepted input,
   wherein the accepted input is simultaneously displayed in a selected one of the multiple selectable input fields,
   wherein a title corresponding to the selected one of the multiple selectable input fields is displayed in the first title section,
   simultaneously displaying the scrollable payroll data section and the data entry section, wherein the data entry section remains in place while different fields of the multiple selectable input fields of the payroll data section are displayed,
   receiving a selection of one of the multiple selectable input fields of the first user interface,
   receiving data input into the data entry section of the first user interface,
   populating the received data into the selected input field of the first user interface,
   modifying the payroll information associated with the first employee with the received data populated into the selected input field of the first user interface,
   generating a second user interface for a second employee in response to at least one of a leftward swipe or a rightward swipe while displaying the first user interface,
   wherein generating the second user interface for the second employee in response to the at least one of a leftward swipe or a rightward swipe comprises displaying a scrollable payroll data section for the second employee comprising multiple selectable input fields and a data entry section for the second employee,
   wherein the data entry section of the second user interface comprises a second title section, a second keypad and a second keypad input field,
   wherein input accepted in the second keypad input field is simultaneously displayed in a selected one of the multiple selectable input fields of the second user interface,
   wherein a title corresponding to the selected one of the multiple selectable input fields is displayed in the second title section,
   wherein the scrollable payroll data section of the second user interface and the data entry section of the second user interface are simultaneously displayed,
   wherein the data entry section of the second user interface remains in place while different fields of the multiple selectable input fields of the scrollable payroll data section of the second user interface are displayed,
   receiving a selection of one of the multiple selectable input fields of the second user interface,
   receiving data input into the data entry section of the second user interface,
   populating the received data into the selected input field of the second user interface,
   modifying the payroll information associated with the second employee with the received data populated into the selected input field of the second user interface, and
   processing a payroll based on the modified payroll information associated with the first employee and the modified payroll information associated with the second employee.

17. The computer-readable medium of claim 16, wherein the steps further comprise displaying multiple selectable pay rates associated with one or more of the first and second employees.

18. The computer-readable medium of claim 16, wherein the multiple selectable input fields of the first user interface are grouped into categories and the scrollable payroll data section for the first employee comprises a category title for each category of multiple selectable input fields.

19. The computer-readable medium of claim 18, wherein the categories comprise earnings and deductions.

20. The computer-readable medium of claim 16, wherein the scrollable payroll data section for the second employee comprises one or more selectable input fields that are not within the multiple selectable input fields of the scrollable payroll data section for the first employee.

* * * * *